(12) United States Patent
Shiraishi

(10) Patent No.: US 8,737,393 B2
(45) Date of Patent: May 27, 2014

(54) COMMUNICATION APPARATUS, CONTROL METHOD FOR COMMUNICATION APPARATUS, AND COMPUTER PROGRAM

(75) Inventor: Daisuke Shiraishi, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 354 days.

(21) Appl. No.: 12/771,993

(22) Filed: Apr. 30, 2010

(65) Prior Publication Data

US 2010/0309909 A1 Dec. 9, 2010

(30) Foreign Application Priority Data

Jun. 4, 2009 (JP) ................................. 2009-135414

(51) Int. Cl.
*H04L 12/28* (2006.01)
*G06F 7/00* (2006.01)
*G06F 17/00* (2006.01)

(52) U.S. Cl.
USPC ........... 370/389; 707/640; 707/609; 707/625; 709/229; 713/151; 718/104

(58) Field of Classification Search
None
See application file for complete search history.

(56) References Cited

U.S. PATENT DOCUMENTS

| | | | | |
|---|---|---|---|---|
| 5,978,849 A | * | 11/1999 | Khanna | 709/227 |
| 7,263,556 B1 | * | 8/2007 | Ramanathan et al. | 709/227 |
| 2006/0277180 A1 | * | 12/2006 | Okamoto | 707/7 |
| 2007/0297334 A1 | * | 12/2007 | Pong | 370/235 |
| 2008/0040494 A1 | * | 2/2008 | Kumar et al. | 709/230 |

FOREIGN PATENT DOCUMENTS

JP 2000-349856 A 12/2000

\* cited by examiner

*Primary Examiner* — Hassan Phillips
*Assistant Examiner* — Lonnie Sweet
(74) *Attorney, Agent, or Firm* — Carter, DeLuca, Farrell & Schmidt LLP

(57) ABSTRACT

A communication apparatus for performing connection type communication includes a first memory configured to store pieces of communication endpoint information relating to communication endpoints of connection, and a moving device configured to move, among the pieces of communication endpoint information stored in the first memory, communication endpoint information of connection set in a disconnection wait state, from the first memory to a second memory.

10 Claims, 10 Drawing Sheets

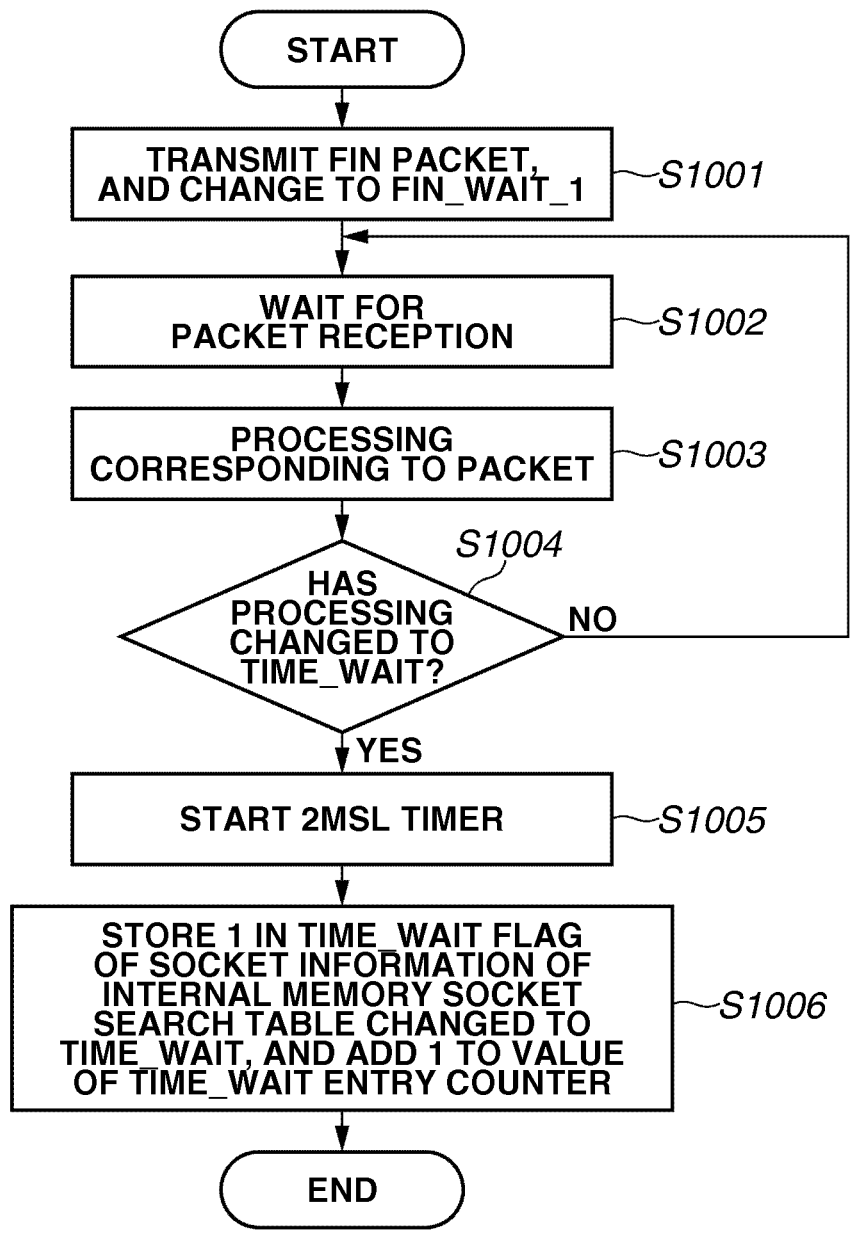

COMMUNICATION APPARATUS, CONTROL METHOD FOR COMMUNICATION APPARATUS, AND COMPUTER PROGRAM

BACKGROUND OF THE INVENTION

1. Field of the Invention

The present invention relates to a communication apparatus, a control method for a communication apparatus, and a computer program, which are suitably used for disconnecting a communication line after a termination of a wait state.

2. Description of the Related Art

In network communication, there has conventionally been known a communication apparatus that performs communication by using a communication protocol for guaranteeing communication reliability. For such a communication protocol, there is a protocol for monitoring a communication status for a given period of time by using a timer. For example, a transmission control protocol (TCP) used in Internet is known. Features of the TCP are connection type communication, a packet retransmission function, and a flow control function.

Basic specification of the TCP is described in RFC 793 of request for comment (RFC) which is an official standard for all relating to the Internet. A communication procedure of the TCP starts with allocation of a communication endpoint of a host computer (hereinafter, referred to as "host"). When referring to Berkeley socket interface, this allocation is the processing corresponding to a socket system call. The communication endpoint established by the socket system call is referred to as a socket. Thus, a given amount of resources necessary for communication is allocated.

Then, connection processing is performed for a specific application of a host at the other end. In this connection processing, a packet for connection is actually transmitted/received. This processing corresponds to a connect system call in the socket interface. After completion of the connection, data transmission/reception is enabled, and data is transmitted/received. After completion of the data transmission/reception, communication for disconnection processing is performed. After completion of the communication, the communication endpoint is deleted, and the resources for communication are released. In other words, the communication line is released. This disconnection processing corresponds to a close system call in the socket interface.

In the TCP communication, a disconnection wait state TIME_WAIT is generally changed to a disconnected state CLOSED by using a timer after a passage of a given period of time (2MSL (Max Segment Lifetime)). In performing mounting, a value of one minute to four minutes is principally set as 2MSL time in the timer, and the state is changed to CLOSED after a timeout. Such waiting for a passage of a given period of time is carried out for the purpose of checking whether an ACK packet transmitted from an own host has surely reached the host at the other end.

More specifically, the own host transmits an ACK packet to the host at the other end and shifts to TIME_WAIT. However, the ACK packet may be lost for one reason or another and does not reach the host at the other end. When the ACK packet transmitted from the own host does not reach the host at the other end, the host at the other end retransmits a FIN packet. Hence, the own host must return an ACK packet corresponding to the retransmitted FIN packet to normally finish disconnection from the host at the other end. Thus, in order to check a retransmitted FIN packet, a wait state of 2MSL time, in other words, a connected state with the host at the other end, must be maintained.

In the TCP communication, during packet reception, in order to determine which connection the received packet is addressed to, TCP socket searching is performed. Thus, a network protocol processing apparatus includes a TCP socket search table that stores, for each connection, socket information containing a port number at the other end, an own port number, an IP address at the other end, and an own IP address. During the packet reception, searching is performed in the TCP socket search table based on "OWN PORT NUMBER", "PORT NUMBER AT OTHER END, "OWN IP ADDRESS", and "IP ADDRESS AT OTHER END" set in the packet, thereby determining which connection the packet is addressed to.

In the conventional communication apparatus, the TCP socket search table is stored in an internal memory to achieve a high speed for TCP socket searching, thereby improving communication performance. However, in order to check normal completion of disconnection from the host at the other end, even during a wait for a passage of 2MSL time, socket information must be secured in the TCP socket search table to enable communication at all times. Thus, when new connection of a communication line is established, the internal memory may not have any free space for storing new socket information. In such a case, there is a problem that it is necessary to wait until TIME_WAIT is finished for one of the communication lines to release the internal memory.

Especially, in a status where a cycle of connection and disconnection with the communication line is short, although data communication is completed, there are many communication endpoints which are not set open due to TIME_WAIT. In a device such as a built-in device that allows only an internal memory of a limited capacity, the internal memory may run short, frequently causing a wait until new connection of a communication line is established.

Under these circumstances, a method has been proposed, which can quickly establish new connection by quickly using a communication line of a TIME_WAIT state while maintaining reliability of communication as much as possible. Japanese Patent Application Laid-Open No. 2000-349856 discusses a technology capable of establishing a new communication line when the internal memory runs short and new connection of a communication line cannot be established, by releasing an internal memory secured by a communication line which has first shifted to TIME_WAIT, irrespective of a passage of time of TIME_WAIT.

However, in the technology discussed in Japanese Patent Application Laid-Open No. 2000-349856, a period of data transfer time is very short and, in a status where a cycle from new allocation of a communication endpoint to disconnection is short, a state shifts to CLOSE for new connection without any wait for a passage of 2MSL time after shifting to TIME_WAIT. Thus, setting of 2MSL time is meaningless, and an influence on reliability of communication cannot be ignored.

SUMMARY OF THE INVENTION

The present invention is directed to quickly establishing new connection of a communication line while maintaining reliability of communication.

According to an aspect of the present invention, a communication apparatus for performing connection type communication includes a first memory configured to store pieces of communication endpoint information relating to communication endpoints of connection, and a moving device configured to move, among the pieces of communication endpoint information stored in the first memory, communication endpoint information of connection set in a disconnection wait state, from the first memory to a second memory.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 10 is a flowchart illustrating an operation of the apparatus during disconnection.

DESCRIPTION OF THE EMBODIMENTS

Various exemplary embodiments, features, and aspects of the invention will be described in detail below with reference to the drawings.

Figure 1:
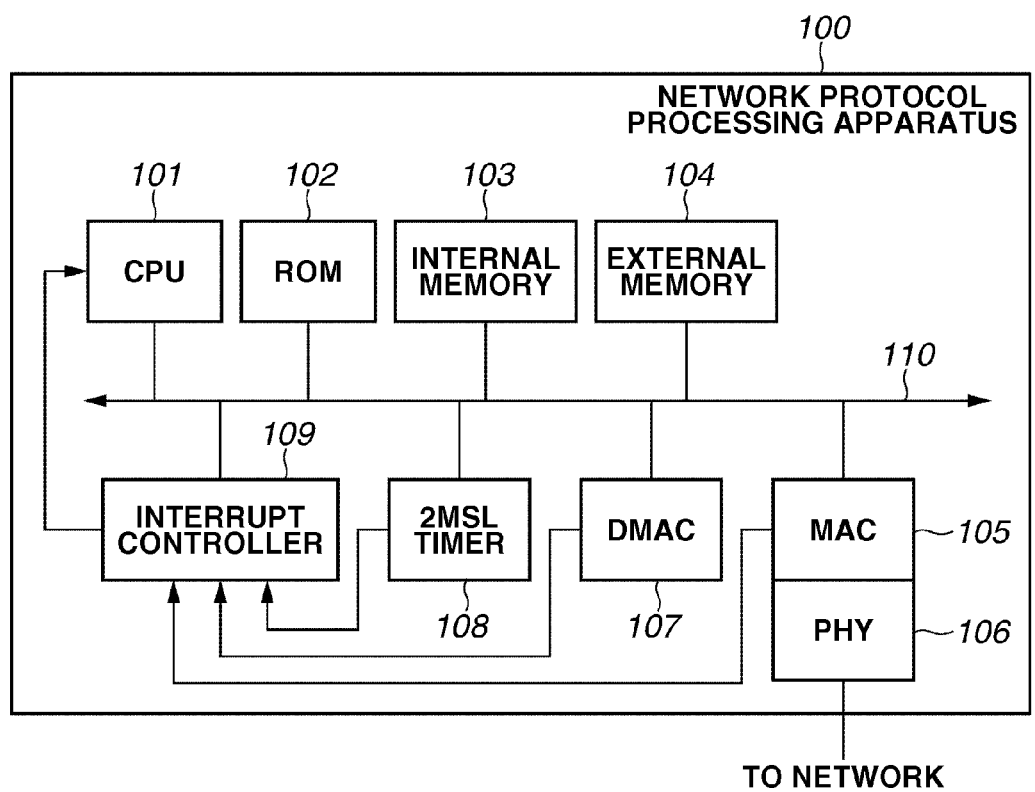
FIG. 1 illustrates a configuration of a network protocol processing apparatus according to a first exemplary embodiment.

Hereinafter, a first exemplary embodiment will be described with reference to the accompanying drawings. FIG. 1 illustrates an example of a configuration of a network protocol processing apparatus that performs connection type communication and connects or disconnects a plurality of connections.

In FIG. 1, a CPU 101 executes TCP/IP network protocol processing by software. A ROM 102 stores the software executed by the CPU 101. An internal memory 103 is used as a socket information search table where connection is not in TIME_WAIT as a connection state of a communication line. An external memory 104 is used as a socket information search table where connection is in TIME_WAIT indicating a disconnected state, or as an execution work area of the CPU 101. A media access controller (MAC) 105 and a physical layer (PHY) 106 perform communication control for a medium layer or below. A direct memory access controller (DMAC) 107 is in control of transfer of data transmitted/received via a TCP/IP network between the external memory 104 and the MAC 105.

A 2MSL timer 108 asserts an interrupt signal when 2MSL time has passed after timer setting. An interrupt controller 109 notifies the CPU 101 of interrupt signals from the MAC 105, the DMAC 107, and the 2MSL timer 108. A bus 110 interconnects the CPU 101, the ROM 102, the internal memory 103, the external memory 104, the MAC 105, the DMAC 107, the 2MSL timer 108, and the interrupt controller 109.

In the exemplary embodiment, the internal memory 103 is realized by a high-speed on-chip SRAM, and the external memory 104 is realized by an inexpensive DRAM. The internal memory 103 and the external memory 104 may be implemented by any storage media as long as the media allow data rewriting.

Figure 2:
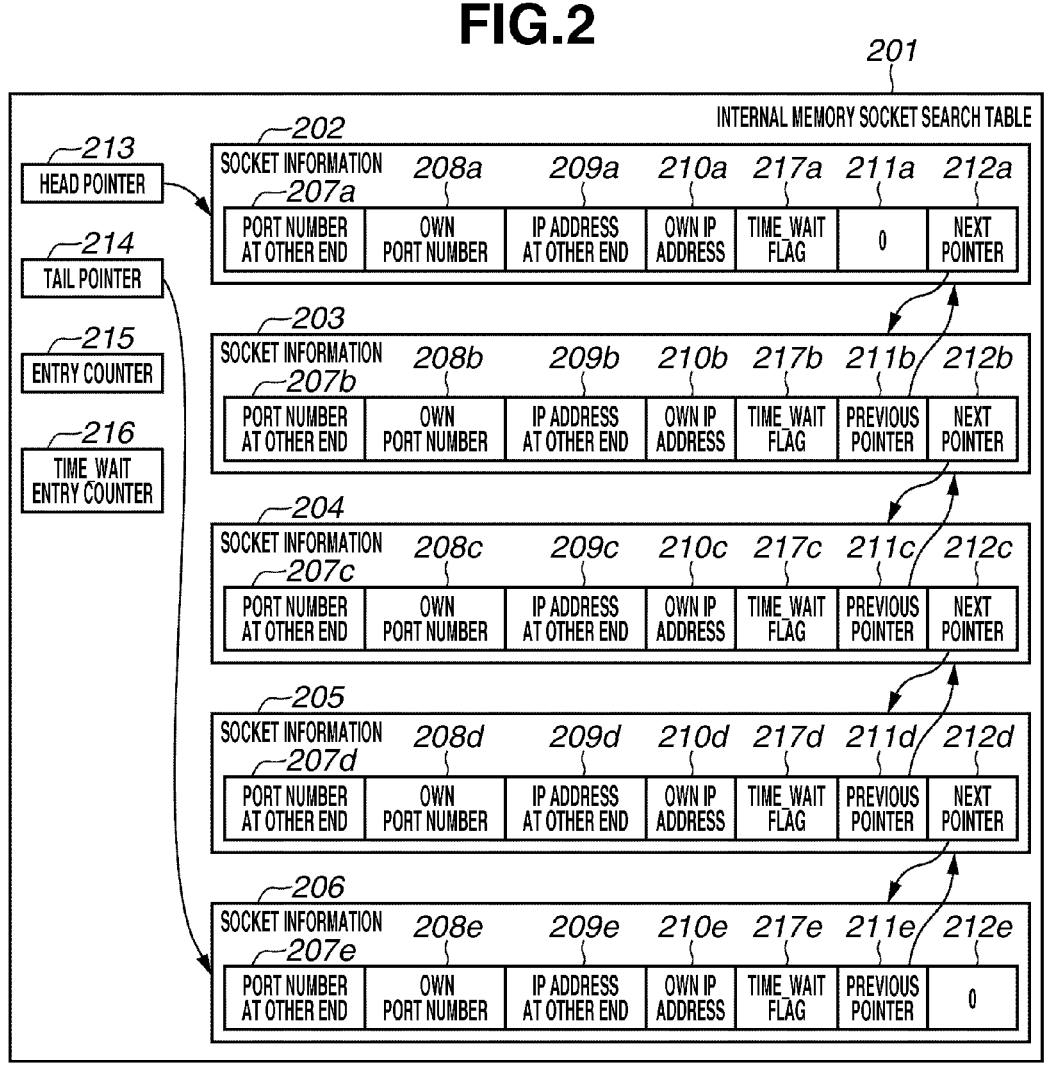
FIG. 2 illustrates a data structure in an internal memory.

FIG. 2 illustrates an example of a data structure in the internal memory 103. The internal memory 103 is used as an internal memory socket search table 201. The internal memory socket search table 201 stores socket information where connection is not in TIME_WAIT. Each of pieces of socket information 202 to 206 contains a port number 207 at the other end, an own port number 208, an IP address 209 at the other end, an own IP address 210, a TIME_WAIT flag 217, a previous pointer 211, and a next pointer 212.

Each of the port number 207 at the other end, the own port number 208, the IP address 209 at the other end, and the own IP address 210 stores information similar to connection corresponding to its socket information. The TIME_WAIT flag 217 stores "1" if the connection corresponding to the socket information has changed to TIME_WAIT, and "0" if the connection has not changed to TIME_WAIT. The pieces of socket information 202 to 206 are managed based on a two-way list. The previous pointer 211 stores an address of last socket information, and the next pointer 212 stores an address of next socket information.

Values of a previous pointer 211a of the socket information at the head of the two-way list and a next pointer 212e of the socket information 206 at the tail end are "0", indicating that there is no socket information before and after. A head pointer 213 stores an address of the socket information 202 at the head of the two-way list. A tail pointer 214 stores an address of the socket information 206 at the tail end of the two-way list. Initial values of the head pointer 213 and the tail pointer 214 are "0", indicating that there is no socket information in the internal memory socket search table 201. An entry counter 215 counts a number of pieces of socket information stored in the internal memory socket search table 201. When a value of the entry counter 215 is equal to a maximum number of pieces of socket information permitted to be stored in the internal memory socket search table 201, the network protocol processing apparatus 100 cannot establish any new connection. Hence, an error is notified to an application.

A TIME_WAIT entry counter 216 counts a number of pieces of socket information having connection set in TIME_WAIT and stored in the internal memory socket search table 201. The TIME_WAIT entry counter 216 is not used in the exemplary embodiment. Socket information of the internal memory socket search table 201 is added when connection is established in response to a request of establishing connection. The socket information is deleted after connection corresponding to the socket information has changed to TIME_WAIT. In the exemplary embodiment, in the internal memory socket search table 201, the socket information includes a two-way list. The CPU 101 sequentially reads data from the two-way list, and compares the data with received packet information, thereby realizing socket information searching. However, socket information searching may also be realized by a content address memory (CAM) or other search hardware.

Figure 3:
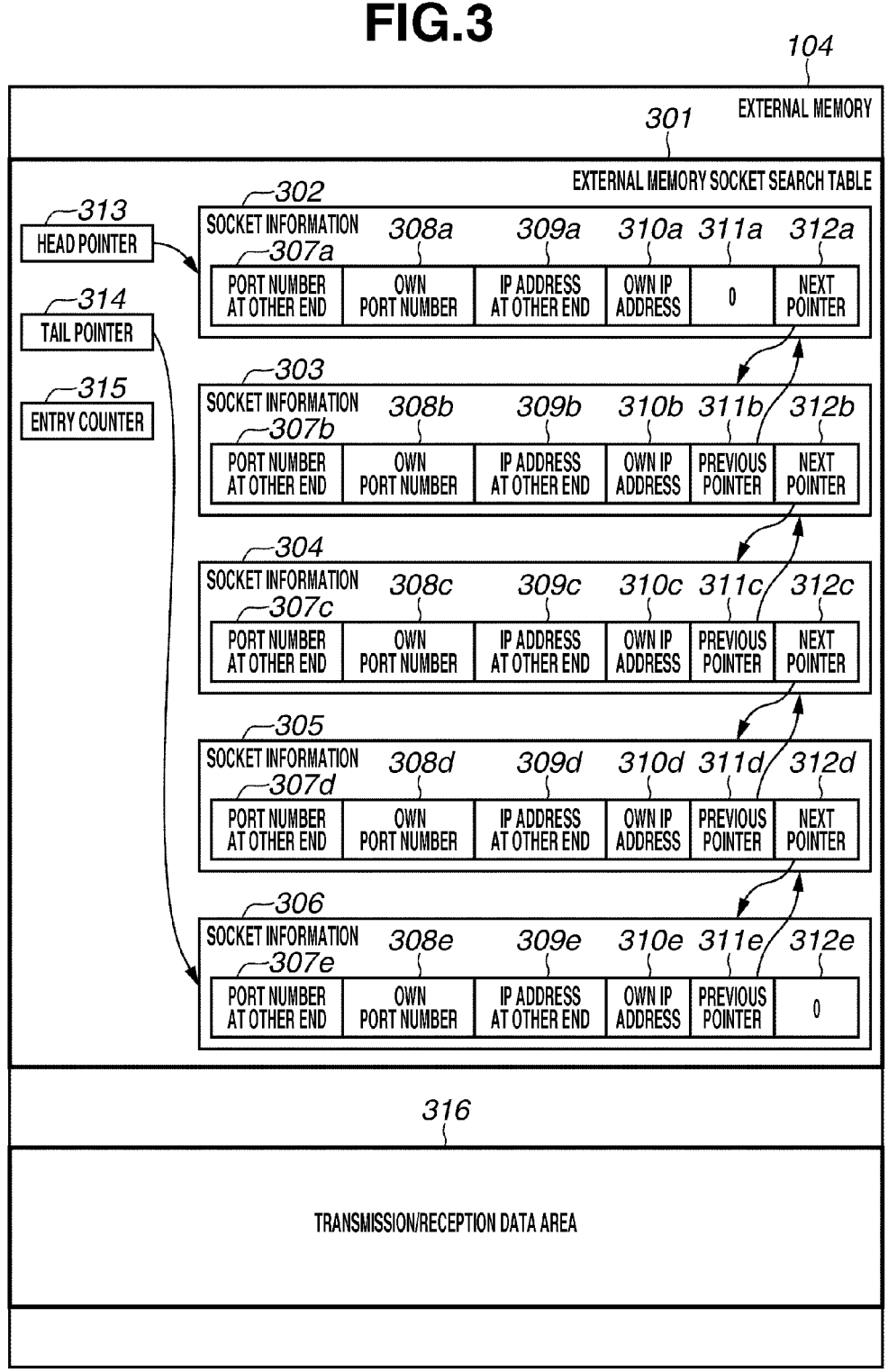
FIG. 3 illustrates a data structure in an external memory.

FIG. 3 illustrates an example of a data structure in the external memory 104. FIG. 3 illustrates only data necessary for describing the exemplary embodiment. Though not illustrated, there are data necessary for realizing network protocol processing in addition to those illustrated in FIG. 3. Work data processed by the CPU 101 is its example.

In FIG. 3, a transmission/reception data area 316 stores a packet transmitted/received by the network protocol processing apparatus 100. An external memory socket search table 301 stores socket information where connection is in TIME_WAIT. Each of pieces of socket information 302 to 306 contains a port number 307 at the other end, an own port number 308, an IP address 309 at the other end, an own IP address 310, a previous pointer 311, and a next pointer 312. Each of the port number 307 at the other end, the own port number 308, the IP address 309 at the other end, and the own IP address 310 stores information similar to connection corresponding to the socket information. The pieces of socket information 302 to 306 are managed based on a two-way list. The previous pointer 311 stores an address of last socket information, and the next pointer 312 stores an address of next socket information.

Values of a previous pointer 311a of the socket information at the head of the two-way list and a next pointer 312e of the socket information 306 at the tail end are "0", indicating that there is no socket information before and after. A head pointer 313 stores an address of the socket information 302 at the head of the two-way list. A tail pointer 314 stores an address of the socket information 306 at the tail end of the two-way list. Initial values of the head pointer 313 and the tail pointer 314 are "0", indicating that there is no socket information in the external memory socket search table 301. An entry counter 315 counts a number of pieces of socket information stored in the external memory socket search table 301.

Even when the internal memory socket search table 201 is filled with entries, and connections for all the entries are simultaneously set in TIME_WAIT states, overflowing must be prevented. Thus, the external memory socket search table 301 must have free spaces for the entries of the internal memory socket search table 201. Hence, when a value of the entry counter 315 is equal to "a maximum number of pieces of socket information permitted to be stored in the external memory socket search table 301—a value of the entry counter 215 of the internal memory socket search table 201", the protocol processing apparatus 100 cannot establish any new connection. Thus, an error is notified to an application. The socket information of the external memory socket search table 301 is added after connection corresponding to the socket information has changed to TIME_WAIT, and deleted when 2MSL time has passed after the change to TIME_WAIT.

When activated, the 2MSL timer 108 holds timeout time obtained by adding 2MSL time to the time of activation. The 2MSL timer 108 asserts, when current time is equal to the timeout time, an interrupt signal to notify the CPU 101 of a passage of 2MSL time via the interrupt controller 109. In the exemplary embodiment, the number of times permitted to simultaneously measure 2MSL time by the 2MSL timer 108 is equal to a number of connections permitted to be simultaneously established by the network protocol processing apparatus 100.

Figure 4:
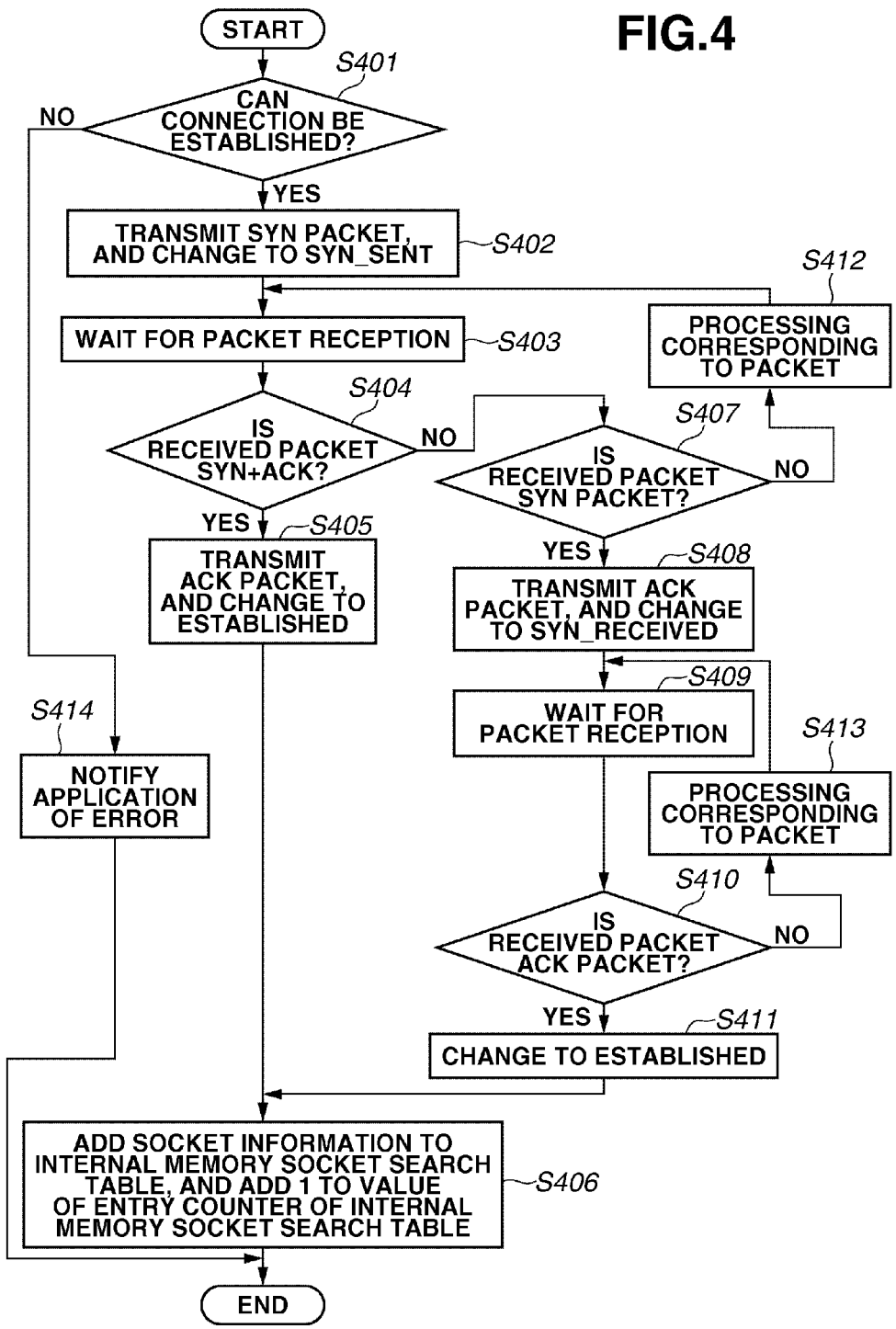
FIG. 4 is a flowchart illustrating an operation of the apparatus in an active open state.
Figure 5:
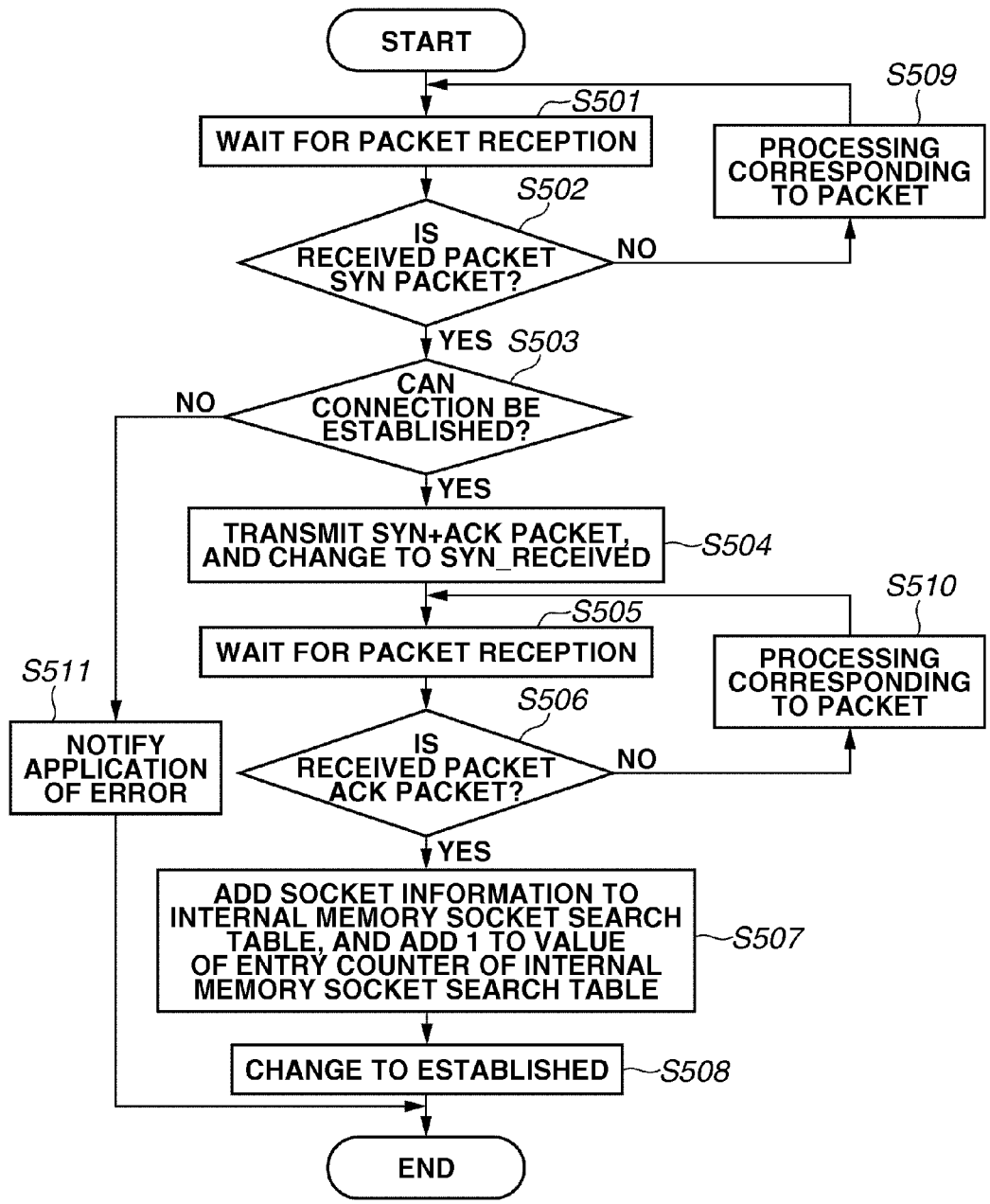
FIG. 5 is a flowchart illustrating an operation of the apparatus in a passive open state.

Next, referring to FIGS. 4 and 5, examples of operations when connection is established in the network protocol processing apparatus 100 of the exemplary embodiment will be described. FIG. 4 is a flowchart in an active open state, and FIG. 5 is a flowchart in a passive open state. Processing of each of the flowcharts of FIGS. 4 and 5 is executed by the CPU 101.

First, referring to FIG. 4, the example of the operation of the network protocol processing apparatus 100 in the active open state will be described.

In step S401, the CPU 101 determines whether connection can be established. More specifically, the CPU 101 determines whether the following first and second conditions are met:

first condition: value of entry counter 215 of internal memory socket search table 201=maximum number of pieces of socket information permitted to be stored in internal memory socket search table 201; and second condition: value of entry counter 315 of external memory socket search table 301=maximum number of pieces of socket information permitted to be stored in external memory socket search table 301−value of entry counter 215 of internal memory socket search table 201

If one of the first and second conditions is met, no connection can be established, hence the CPU 101 proceeds to step S414. In step S414, the CPU 101 notifies the application of an error to finish the processing.

On the other hand, if neither of the first and second conditions is met, connection can be established, hence the CPU 101 proceeds to step S402. In step S402, the CPU 101 transmits a SYN packet to the host at the other end to change a state to SYN_SENT. In step S403, the CPU 101 waits for reception of a packet. Upon reception of a packet, in step S404, the CPU 101 determines whether the received packet is a SYN+ACK packet from the host at the other end to which the SYN packet has been transmitted. If a result of the determination shows that the received packet is a SYN+ACK packet, the CPU 101 proceeds to step S405. In step S405, the CPU 101 transmits an ACK packet to change the state to ESTABLISHED. In step S406, the CPU 101 adds socket information of the newly established connection to the internal memory socket search table 201, and "1" to a value of the entry counter 215 of the internal memory socket search table 201.

An example of an addition procedure of socket information to the internal memory socket search table 201 will be described. The CPU 101 generates new socket information in the internal memory socket search table 201. The CPU 101 stores pieces of information corresponding to the newly established connection in "PORT NUMBER 207 AT OTHER END", "OWN PORT NUMBER 208", "IP ADDRESS 209 AT OTHER END", and "OWN IP ADDRESS 210" of the generated socket information. The CPU 101 stores a content of the tail pointer 214 in the previous pointer 211 of the socket information. The CPU 101 stores "0" in the next pointer 212 of the socket information.

If the content of the tail pointer 214 stored in the previous pointer 211 is not "0", the CPU 101 stores an address of the generated socket information in the next pointer 212 of the socket information indicated by the tail pointer 214. The CPU 101 stores an address of the generated socket information in the tail pointer 214. On the other hand, if the content of the tail pointer 214 stored in the previous pointer 211 is "0", the CPU 101 stores the address of the generated socket information in the head pointer 213 and the tail pointer 214. Through this procedure, the socket information of the newly established connection is added to the internal memory socket search table 201. The number of pieces of socket information stored in the internal memory socket search table 201 has increased, hence the CPU 101 adds "1" to the value of the entry counter 215.

Referring back to FIG. 4, if it is determined that the received packet is not a SYN+ACK packet from the host at the other end to which the SYN packet has been transmitted (NO in step S404), the CPU 101 proceeds to step S407. In step S407, the CPU 101 determines whether the received packet is a SYN packet from the host at the other end. If a result of the determination shows that the received packet is a SYN packet from the host at the other end, the CPU 101 proceeds to step S408. In step S408, the CPU 101 transmits an ACK packet to the host at the other end to change the state to SYN_RECEIVED.

In step S409, the CPU 101 waits for reception of a packet. Upon reception of a packet, the CPU 101 proceeds to step S410. The CPU 101 determines whether the received packet is an ACK packet for the transmitted SYN packet. If a result of the determination shows that the received packet is an ACK packet for the transmitted SYN packet, the CPU 101 proceeds to step S411. The CPU 101 changes the state to ESTABLISHED and proceeds to step S406.

If it is determined that the received packet is not a SYN packet from the host at the other end (NO in step S407), the CPU 101 proceeds to step S412. In step S412, the CPU 101 performs processing corresponding to the received packet, and waits for reception of a packet in step S403.

If it is determined that the received packet is not an ACK packet for the transmitted SYN packet (NO in step S410), the CPU 101 proceeds to step S413. In step S413, the CPU 101 performs processing corresponding to the received packet, and waits for reception of a packet in step S409.

Next, referring to FIG. 5, the example of the operation of the network protocol processing apparatus 100 in the passive open state will be described.

In step S501, the CPU 101 waits for reception of a packet. Upon reception of a packet, the CPU 101 proceeds to step S502 to determine whether the received packet is a SYN packet. If a result of the determination shows that the received packet is a SYN packet, the CPU 101 proceeds to step S503. In step S503, the CPU 101 determines whether connection can be established. More specifically, the CPU 101 determines whether the following first and second conditions are met:

first condition: value of entry counter 215 of internal memory socket search table 201=maximum number of pieces of socket information permitted to be stored in internal memory socket search table 201; and second condition: value of entry counter 315 of external memory socket search table 301=maximum number of pieces of socket information permitted to be stored in external memory socket search table 301−value of entry counter 215 of internal memory socket search table 201

If one of the first and second conditions is met, no connection can be established, hence the CPU 101 proceeds to step S511. In step S511, the CPU 101 notifies the application of an error and finishes the processing.

On the other hand, if neither of the first and second conditions is met, connection can be established, hence the CPU 101 proceeds to step S504. In step S504, the CPU 101 transmits a SYN+ACK packet to the host at the other end to which the SYN packet has been transmitted to change a state to SYN_RECEIVED. In step S505, the CPU 101 waits for reception of a packet. Upon reception of a packet, the CPU 101 proceeds to step S506 to determine whether the received packet is an ACK packet for the transmitted SYN packet. If a result of the determination shows that the received packet is an ACK packet for the transmitted SYN packet, the CPU 101 proceeds to step S507. In step S507, the CPU 101 adds socket information of the newly established connection to the internal memory socket search table 201, and "1" to a value of the entry counter 215 of the internal memory socket search table 201. An addition procedure of socket information to the internal memory socket search table 201 is similar to that in the active open state, and thus detailed description thereof will be omitted. Then, in step S508, the CPU 101 changes the state to ESTABLISHED.

If it is determined that the received packet is not a SYN packet (NO in step S502), the CPU 101 proceeds to step S509. The CPU 101 performs processing corresponding to the received packet, and then proceeds to step S501 to wait for reception of a packet. If it is determined that the received packet is not an ACK packet for the transmitted SYN packet (NO in step S506), the CPU 101 proceeds to step S510. The CPU 101 performs processing corresponding to the received packet, and then proceeds to step S505 to wait for reception of a packet.

FIGS. 4 and 5 illustrate the examples where the changes to ESTABLISHED and the updating of the internal memory socket search table 201 are reverse in order between the active open state and the passive open state. However, the orders may also be same between the active open state and the passive open state. In other words, the order of steps S405, S411, and S406 may be opposite to the order illustrated in FIG. 4, and the order of steps S507 and s508 may be opposite to the order illustrated in FIG. 5.

Figure 6:
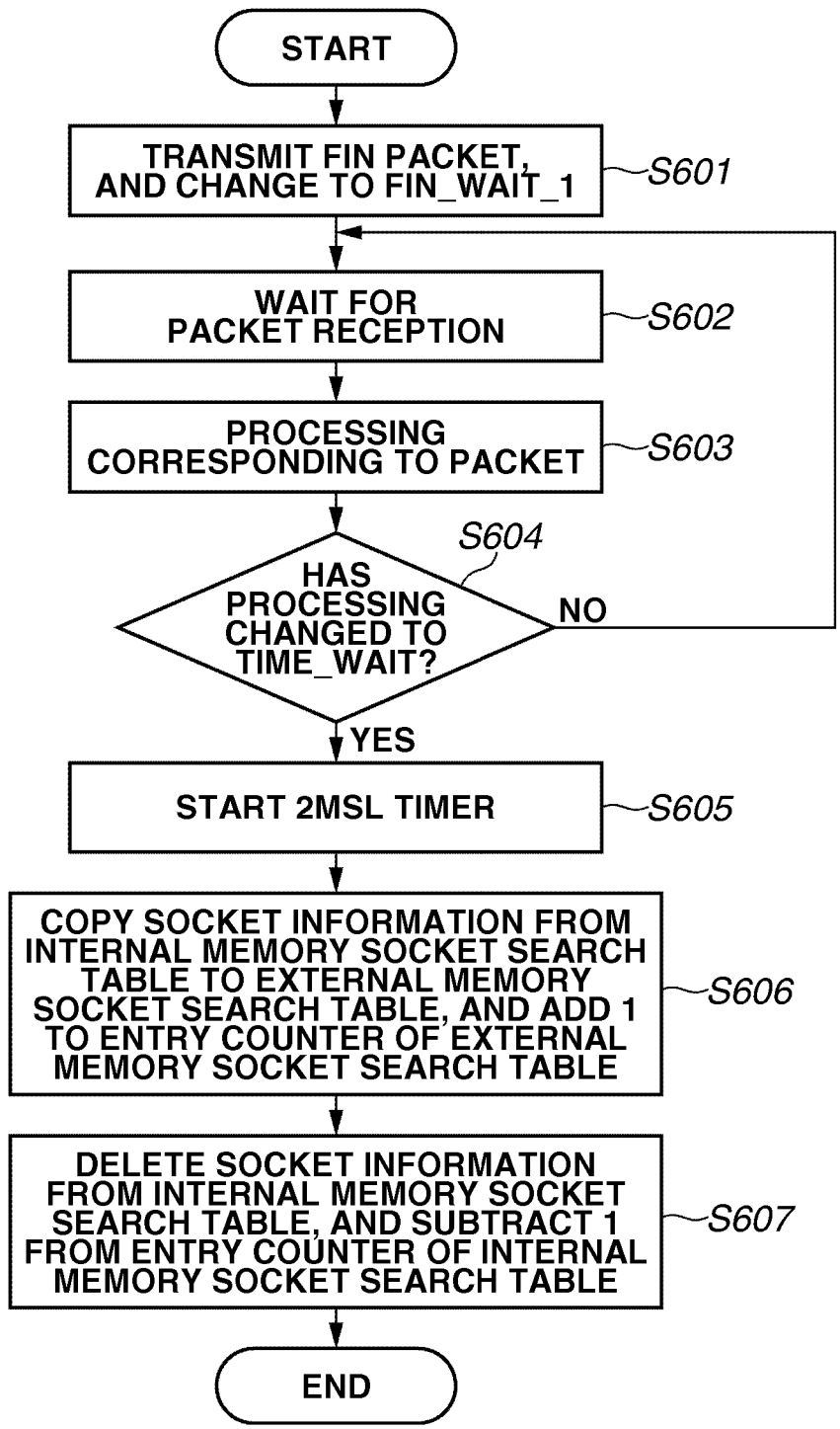
FIG. 6 is a flowchart illustrating an operation of the apparatus during disconnection.

Next, referring to FIG. 6, an example of an operation of the network protocol processing apparatus 100 during disconnection will be described. FIG. 6 is a flowchart illustrating the example of the operation of the network protocol processing apparatus 100 during disconnection. Processing of the flowchart of FIG. 6 is executed by the CPU 101.

First, in step S601, the CPU 101 transmits a FIN packet to the host at the other end to change the state to FIN_WAIT_1. In step S602, the CPU 101 waits for reception of a packet. In this state, the following four packets (1) to (4) may be transmitted from the host at the other end:

(1) ACK packet for FIN packet transmitted from the own host;
(2) Fin packet containing no ACK for Fin packet transmitted from the own host;
(3) Packet containing both ACK for FIN packet transmitted from the own host and Fin from the host at the other end; and
(4) Packet other than (1) to (4)

In step S603, the CPU 101 executes processing corresponding to the received packet. In step S604, the CPU 101 determines whether the state has changed to TIME_WAIT as a result of the processing of step S603.

More specifically, in step S603, the CPU 101 performs the following handling processes (1) to (4):

(1) When an ACK packet for a FIN packet transmitted from the own host is received, the CPU 101 changes the state to FIN_WAIT_2. When a FIN packet is received from the host at the other end in this state, the CPU 101 returns an ACK packet in response to the FIN packet to change the state to TIME_WAIT.

(2) When a FIN packet containing no ACK for a FIN packet transmitted from the own host is received from the host at the other end, the CPU 101 returns an ACK packet in response to the FIN packet from the host at the other end to change the state to CLOSING. Then, when an ACK packet for the FIN packet transmitted from the own host is received, the CPU 101 changes the state to TIME_WAIT.

(3) When a packet containing an ACK for the FIN packet transmitted from the own host and FIN from the host at the other end is received, the CPU 101 returns an ACK packet in response to the packet (FIN) from the host at the other end. Then, the CPU 101 changes the state to TIME_WAIT.

(4) When a packet other than the above is received, the CPU 101 maintains a state of FIN_WAIT_1 without changing the state to TIME_WAIT.

After the stage has changed to TIME_WAIT through the processing of step S603 and as a result of step S604, the CPU 101 proceeds to step S605. In step S605, the CPU 101 activates the 2MSL timer 108 to release the TIME_WAIT state.

The processing thus far is the one compliant with the TCP specification. In the exemplary embodiment, in step S606, the CPU 101 copies "socket information in internal memory socket search table 201" corresponding to the connection changed to TIME_WAIT, to a tail end of the two-way list of the external memory socket search table 301. The CPU 101 can identify socket information to be copied based on an address of socket information matched in TCP socket searching when the ACK packet for the transmitted FIN packet is received during disconnection.

Hereinafter, an example of a procedure of copying socket information from the internal memory socket search table 201 to the external memory socket search table 301 will be described.

First, the CPU 101 generates new socket information in the external memory socket search table 301. The CPU 101 stores information corresponding to socket information to be copied in "PORT NUMBER 307 AT OTHER END", "OWN PORT NUMBER 308", "IP ADDRESS 309 AT OTHER END", and "OWN IP ADDRESS 310". The CPU 101 stores a content of the tail pointer 314 in the previous pointer 311.

When the content of the tail pointer 314 stored in the previous pointer 311 is not "0", the CPU 101 stores an address of the generated socket information in the next pointer 312 of the socket information indicated by the tail pointer 314. The CPU 101 stores the address of the generated socket information in the tail pointer 314. On the other hand, if the content of the tail pointer 314 stored in the previous pointer 311 is "0", the CPU 101 stores the address of the generated socket information in the head pointer 313 and the tail pointer 314.

In the exemplary embodiment, through the above procedure, the CPU 101 copies the socket information corresponding to the connection changed to TIME_WAIT, from the internal memory socket search table 201 to the tail end of the two-way list of the external memory socket search table 301. In the external memory socket search table 301, pieces of socket information are added to the tail end of the two-way list in changing order of the state to TIME_WAIT, hence the pieces of socket information are arrayed in the changing order of the state to TIME_WAIT. The amount of socket information to be stored in the external memory socket search table 301 has increased. Hence, after copying of the socket information, the CPU 101 adds "1" to a value of the entry counter 315 of the external memory socket search table 301.

Referring back to FIG. 6, in step S607, the CPU 101 deletes "socket information in internal memory socket search table 201" corresponding to the connection changed to the TIME_WAIT state. Hereinafter, an example of a deletion procedure will be described.

First, if the previous pointer 211 of socket information to be deleted is not "0", the CPU 101 stores a value of the next pointer 212 of the socket information to be deleted, in the next pointer 212 of the socket information indicated by the previous pointer 211 of the socket information to be deleted. On the other hand, if the previous pointer of the socket information to be deleted is "0", the CPU 101 stores a value of the next pointer 212 of the socket information to be deleted in the head pointer 213. The CPU 101 sets to "0" the previous pointer 211 of the socket information indicated by the next pointer 212 of the socket information to be deleted.

If the next pointer 212 of the socket information to be deleted is not "0", the CPU 101 stores a value of the previous pointer 211 of the socket information to be deleted, in the previous pointer 211 of the socket information indicated by the next pointer 212. On the other hand, if the next pointer of the socket information to be deleted is "0", the CPU 101 stores a value of the previous pointer 211 of the socket information to be deleted, in the tail pointer 214. The CPU 101 sets to "0" the next pointer 212 of the socket information indicated by the previous pointer 211 of the socket information to be deleted.

The CPU 101 deletes the socket information to be deleted. After the deletion of the socket information, the CPU 101 subtracts "1" from a value of the entry counter 215 of the internal memory socket search table 201. Through steps S606 and S607, the socket information of the connection set in TIME_WAIT does not occupy the internal memory 103 to enable quick establishment of new connection. The socket information of the connection set in TIME_WAIT is not discarded but saved in the external memory 104, so that reliability of communication can be secured.

Next, an example of an operation of the network protocol processing apparatus 100 upon time-out of the 2MSL timer 108 will be described.

After the timeout of the 2MSL timer 108, an interrupt signal is asserted to notify the CPU 101 of a passage of 2MSL time via the interrupt controller 109. The CPU 10 that has received this notification deletes, from the external memory socket search table 301, socket information of connection where 2MSL time has passed after its change to TIME_WAIT. An example of a deletion procedure of socket information will be described below.

In the external memory socket search table 301, pieces of socket information are arrayed in order of change to TIME_WAIT. Thus, upon the time-out of the 2MSL timer 108, the CPU 101 only needs to delete the first socket information. In other words, the CPU 101 deletes head socket information of the two-way list.

If the next pointer 312 of the socket information indicated by the head pointer 313 is not "0", the CPU 101 stores "0" in the previous pointer 311 of the socket information indicated by the next pointer 312. The CPU 101 stores a value of the next pointer 312 of the socket information to be deleted in the head pointer 313.

On the other hand, if the next pointer 312 of the socket information indicated by the head pointer 313 is "0", the CPU 101 stores "0" in the head pointer 313 and the tail pointer 314. After completion of this procedure, the CPU 101 deletes socket information of connection where 2MSL time has passed after its change to TIME_WAIT. This processing eliminates the necessity of searching for socket information to be deleted, thereby facilitating management of socket information.

Figure 7:
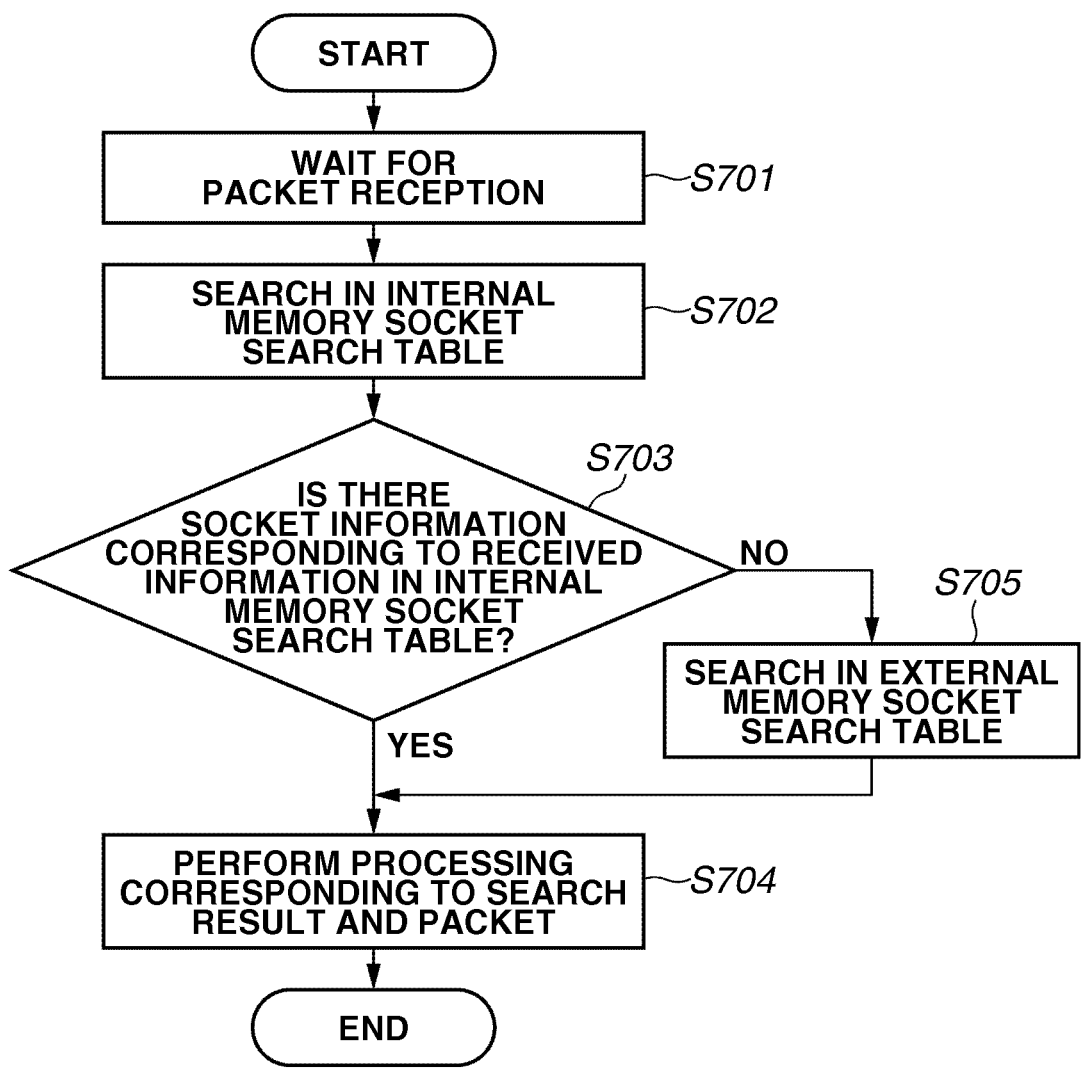
FIG. 7 is a flowchart illustrating an operation of the apparatus during searching for TCP socket.

Referring to FIG. 7, an example of an operation of the network protocol processing apparatus 100 during TCP socket searching will be described. FIG. 7 is a flowchart illustrating the example of the operation of the network protocol processing apparatus 100 during the TCP socket searching. Processing of the flowchart of FIG. 7 is executed by the CPU 101.

In step S701, the CPU 101 waits for reception of a packet. After reception of a packet, the CPU 101 proceeds to step S702. In step S702, the CPU 101 searches for data in the internal memory socket search table 201 by using "PORT NUMBER AT OTHER END", "OWN PORT NUMBER", "IP ADDRESS AT OTHER END", and "OWN IP ADDRESS" of the received packet. To perform searching in the internal memory socket search table 201, the CPU 101 first reads socket information indicated by the head pointer 213, and compares the read socket information with the "PORT NUMBER AT OTHER END", the "OWN PORT NUMBER", the "IP ADDRESS AT OTHER END", and the "OWN IP ADDRESS" of the received packet. If a result of the comparison shows coincidence, the CPU 101 finishes the searching. If not coincident, the CPU 101 repeats, until the next pointer 212 becomes "0", processing of reading socket information indicated by the next pointer 212 of the read socket information, and comparing the read socket information with received information. After the next pointer 212 has become "0", there is no socket information coincident with the received information in the internal memory socket search table 201.

Referring back to FIG. 7, in step S703, the CPU 101 determines a result of the searching of step S702. More specifically, the CPU 101 determines whether there is socket information coincident with the "PORT NUMBER AT OTHER END", the "OWN PORT NUMBER", the "IP ADDRESS AT OTHER END", and the "OWN IP ADDRESS" of the received packet in the internal memory socket search table 201. If a result of the determination shows that there is socket information coincident with the received information, the CPU 101 determines that the received packet is valid, and proceeds to step S704. In step S704, the CPU 101 performs processing corresponding to the received packet.

If there is no socket information coincident with the received information, the CPU 101 determines that the received packet is a packet addressed to connection set in a TIME_WAIT state or an invalid packet for connection yet to be established, and proceeds to step S705. In step S705, the CPU 101 searches for data in the external memory socket search table 301. To perform searching in the external memory socket search table 301, the CPU 101 first reads socket information indicated by the tail pointer 314, and compares the read socket information with the "PORT NUMBER AT OTHER END", the "OWN PORT NUMBER", the "IP ADDRESS AT OTHER END", and the "OWN IP ADDRESS" of the received packet. If a result of the comparison shows coincidence, the CPU 101 finishes the processing. On the other hand, if not coincident, the CPU 101 repeats, until the previous pointer 311 becomes "0", processing of reading socket information indicated by the previous pointer 311 of the read socket information, and comparing the read socket information with the received information. After the previous pointer 311 has become "0", there is no socket information coincident with the received information in the external memory socket search table 301.

Referring back to FIG. 7, in step S704, the CPU 101 performs processing corresponding to searching results of steps S702 and S705 and the packet received in step S701. The longer time after the change to TIME_WAIT, the lower possibility of executing communication. Thus, searching in the external memory socket search table 301 in order reverse to the order of change to TIME_WAIT increases a hitting probability of the received information, and shortens searching time.

Next, a second exemplary embodiment will be described. This exemplary embodiment is different from the first exemplary embodiment in a part of processing during establishment of connection, disconnection, and timeout of the 2MSL timer 108. Portions of the exemplary embodiment similar to those of the first exemplary embodiment are denoted by similar reference numerals illustrated in FIG. 1 to 7, and detailed description thereof will be omitted.

In this exemplary embodiment, a TIME_WAIT entry counter 216 is used. The TIME_WAIT entry counter 216 counts a number of pieces of socket information where connection stored in an internal memory socket search table 201 is set in TIME_WAIT. Thus, when a value of an entry counter 215 is equal to a maximum number of pieces of socket information permitted to be stored in the internal memory socket search table 201, and the TIME_WAIT entry counter 216 is "0", no new connection can be established. In this case, an error is notified to an application. Even when the value of the entry counter 215 is equal to the maximum number of pieces of socket information permitted to be stored in the internal memory socket search table 201, if there are pieces of socket information changed to TIME_WAIT, the socket information whose passage of time after the change is longest is moved to an external memory socket search table 301.

However, if a value of an entry counter 315 is equal to a maximum number of pieces of socket information permitted to be stored in the external memory socket search table 301, no socket information can be moved from the internal memory socket search table 201 to the external memory socket search table 301. Thus, no new connection can be established, and an error is notified to the application. Socket information of the external memory socket search table 301 is added when the application is evicted from the internal memory socket search table 201, and deleted when 2MSL time has passed after a change of corresponding connection to TIME_WAIT.

Figure 8:
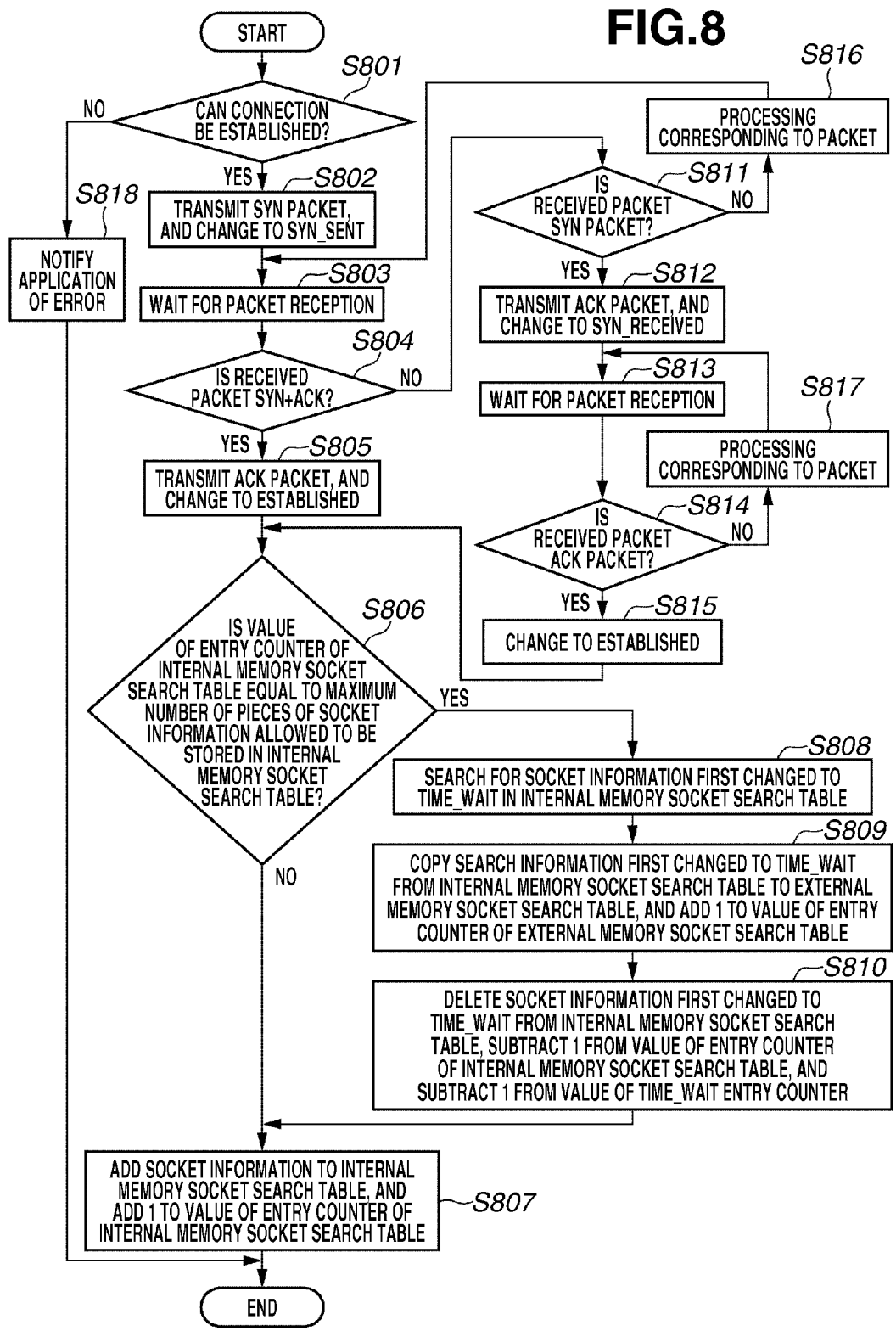
FIG. 8 is a flowchart illustrating an operation of a network protocol processing apparatus in an active open state according to a second exemplary embodiment.
Figure 9:
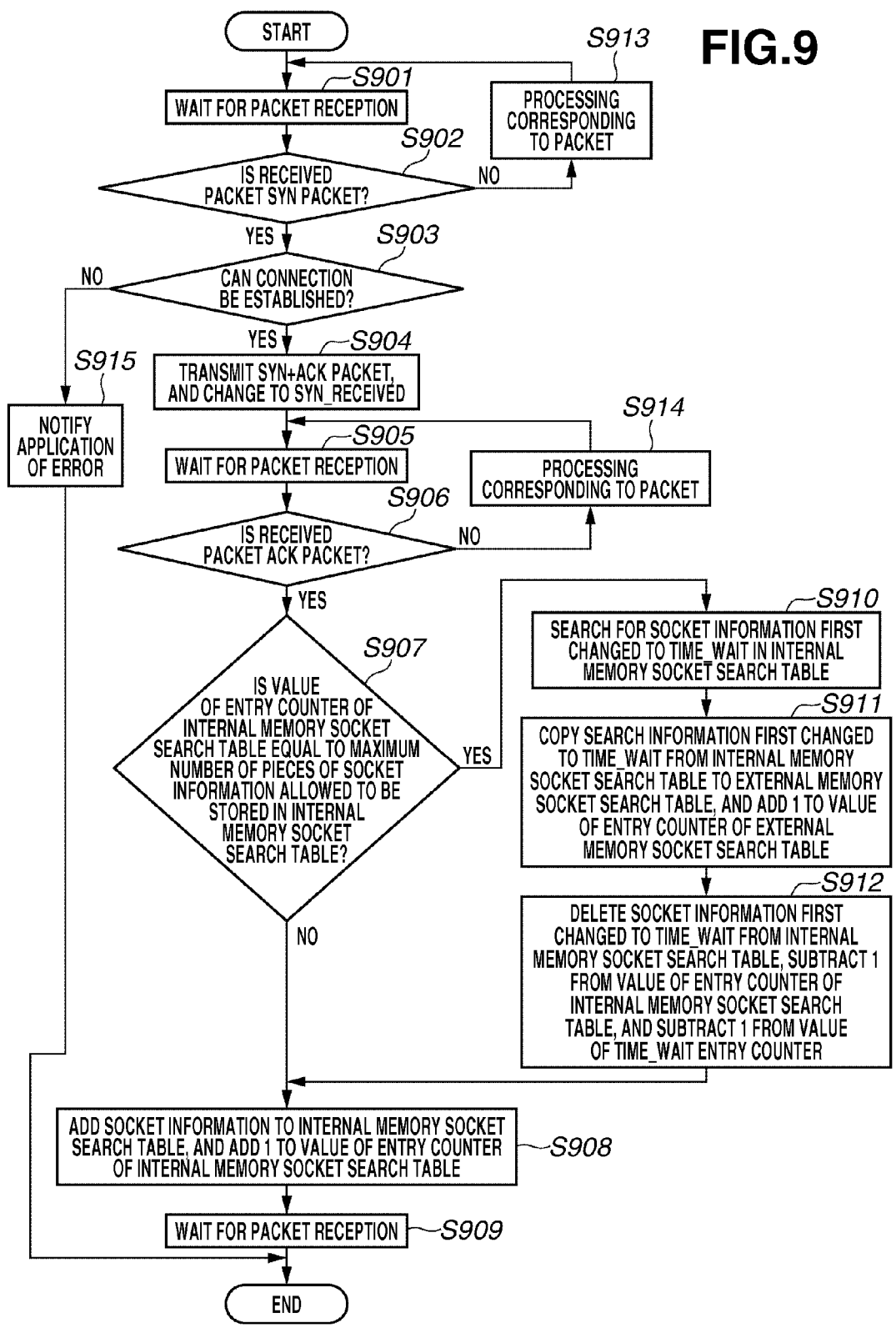
FIG. 9 is a flowchart illustrating an operation of the apparatus in a passive open state.

Next, referring to FIGS. 8 and 9, an example of an operation of the network protocol processing apparatus 100 of the exemplary embodiment when connection is established will be described. FIG. 8 is a flowchart in an active open state, and FIG. 9 is a flowchart in a passive open state. Each processing of the flowcharts of FIGS. 8 and 9 is executed by a CPU 101.

First, referring to FIG. 8, the example of the operation of the network protocol processing apparatus 100 in the active open state will be described.

In step S801, the CPU 101 determines whether connection can be established. More specifically, the CPU 101 determines whether the following first and second conditions are met.

First Condition: (1) and (2) below
(1) Value of entry counter 215 of internal memory socket search table 201=maximum number of pieces of socket information permitted to be stored in internal memory socket search table
(2) Value of TIME_WAIT entry counter 216=0
Second Condition: (1), (2) and (3) below
(1) Value of entry counter 215 of internal memory socket search table 201=maximum number of pieces of socket information permitted to be stored in internal memory socket search table 201
(2) Value of TIME_WAIT entry counter 216≠0
(3) Value of entry counter 315 of external memory socket search table 301=maximum number of pieces of socket information permitted to be stored in external memory socket search table 301

If one of the first and second conditions is met, no connection can be established, hence the CPU 101 proceeds to step S818. In step S818, the CPU 101 notifies the application of an error and finishes the processing.

On the other hand, if neither of the first and second conditions is met, connection can be established, hence the CPU 101 proceeds to step S802. In step S802, the CPU 101 transmits a SYN packet to a host at the other end to change a state to SYN_SEN. In step S803, the CPU 101 waits for reception of a packet. Upon reception of a packet, in step S804, the CPU 101 determines whether the received packet is a SYN+ACK packet from the host at the other end to which the SYN packet has been transmitted. If a result of the determination shows that the received packet is a SYN+ACK packet, the CPU 101 proceeds to step S805. In step S805, the CPU 101 transmits an ACK packet to change the state to ESTABLISHED.

In step S806, the CPU 101 determines whether a value of the entry counter 215 of the internal memory socket search table 201 is equal to a maximum number (threshold value) permitted to be stored in the internal memory socket search table 201. If a result of the determination shows that the value of the entry counter 215 is not equal to the maximum number permitted to be stored in the internal memory socket search table 201, the internal memory socket search table 201 has a free space for storing socket information of the newly established connection. Thus, the CPU 101 proceeds to step S807, and adds the socket information of the newly established connection to the internal memory socket search table 201. An addition procedure of socket information to the internal memory socket search table 201 is similar to that of the first exemplary embodiment. In a TIME_WAIT flag 217 of generated socket information, "0" indicating that connection is not in TIME_WAIT is stored. The amount of socket information stored in the internal memory socket search table 201 has increased, hence the CPU 101 adds "1" to the value of the entry counter 215.

If it is determined that the value of the entry counter 215 is equal to the maximum number permitted to be stored in the internal memory socket search table 201 (YES in step S806), the CPU 101 proceeds to step S808. In step S808, the CPU 101 searches for socket information of connection first changed to TIME_WAIT in the internal memory socket search table 201. An example of a searching procedure will be described below.

First, the CPU 101 reads socket information indicated by the head pointer 213, and checks whether the TIME_WAIT flag 217 of the socket information is "1". If a result of the checking shows that the TIME_WAIT flag 217 is "1", the socket information is information of connection first changed to TIME_WAIT. If the TIME_WAIT flag 217 is "0", the CPU 101 reads socket information indicated by the next pointer 212 of the socket information indicated by the head pointer 213. Then, the CPU 101 repeats processing of checking the TIME_WAIT flag of the read socket information until socket information having a TIME_WAIT flag set to "1" is read.

In step S809, the CPU 101 copies the "socket information of the connection first changed to the TIME_WAIT state" detected in step S808 to the external memory socket search table 301. A copying procedure of socket information from the internal memory socket search table 201 to the external memory socket search table 301 is similar to that of the first exemplary embodiment, and thus detailed description thereof will be omitted. After copying of the socket information of the connection first changed to TIME_WAIT, the CPU 101 adds "1" to a value of the entry counter 315 of the external memory socket search table 301. In step S810, the CPU 101 deletes socket information in the internal memory socket search table 201 corresponding to the connection first changed to the TIME_WAIT state. A deletion procedure of the socket information of the internal memory socket search table 201 is similar to that of the first exemplary embodiment, and thus detailed description thereof will be omitted. After deletion of the socket information corresponding to the connection first changed to the TIME_WAIT state, the CPU 101 subtracts "1" from the value of the entry counter 215 of the internal memory socket search table 201 and the value of the TIME_WAIT entry counter 216. Then, the CPU 101 proceeds to step S807.

If it is determined that the received packet is not a SYN+ACK packet (NO in step S804), the CPU 101 proceeds to step S811. In step S811, the CPU 101 determines whether the received packet is a SYN packet from the host at the other end. If a result of the determination shows that the received packet is a SYN packet from the host at the other end, the CPU 101 proceeds to step S812. In step S812, the CPU 101 transmits an ACK packet to the host at the other end to change the state to SYN_RECEIVED. In step S813, the CPU 101 waits for reception of a packet. In step S814, the CPU 101 determines whether the received packet is an ACK packet for the transmitted SYN packet. If a result of the determination shows that the received packet is an ACK packet for the transmitted SYN packet, the CPU 101 proceeds to step S815. In step S815, the CPU 101 changes the state to ESTABLISHED and proceeds to step S806.

If it is determined that the received packet is not a SYN packet (NO in step S811), the CPU 101 proceeds to step S816. In step S816, the CPU 101 performs processing corresponding to the received packet, and then waits for reception of a packet in step S803.

If it is determined that the received packet is not an ACK packet for the transmitted SYN packet (NO in step S814), the CPU 101 proceeds to step S817. In step S817, the CPU 101 performs processing corresponding to the received packet, and then waits for reception of a packet in step S813.

Next, referring to FIG. 9, the example of the operation of the network protocol processing apparatus 100 in the passive open state will be described.

In step S901, the CPU 101 waits for reception of a packet. Upon reception of a packet, the CPU 101 proceeds to step S902. In step S902, the CPU 101 determines whether the received packet is a SYN packet. If a result of the determination shows that the received packet is a SYN packet, the CPU 101 proceeds to step S903. In step S903, the CPU 101 determines whether connection can be established. More specifically, the CPU 101 determines whether the following first and second conditions are met.

First Condition: (1) and (2) below
(1) Value of entry counter 215 of internal memory socket search table 201=maximum number of pieces of socket information permitted to be stored in internal memory socket search table
(2) Value of TIME_WAIT entry counter 216=0

Second Condition: (1), (2) and (3) below
(1) Value of entry counter 215 of internal memory socket search table 201=maximum number of pieces of socket information permitted to be stored in internal memory socket search table 201
(2) Value of TIME_WAIT entry counter 216≠0
(3) Value of entry counter 315 of external memory socket search table 301=maximum number of pieces of socket information permitted to be stored in external memory socket search table 301

If one of the first and second conditions is met, no connection can be established, hence the CPU 101 proceeds to step S915. In step S915, the CPU 101 notifies the application of an error and finishes the processing.

On the other hand, if neither of the first and second conditions is met, connection can be established, hence the CPU 101 proceeds to step S904. In step S904, the CPU 101 transmits a SYN+ACK packet to the host at the other end to which the SYN packet has been transmitted to change a state to SYN_RECEIVED. In step S905, the CPU 101 waits for reception of a packet. Upon reception of a packet, the CPU 101 proceeds to step S906 to determine whether the received packet is an ACK packet of the transmitted SYN packet. If a result of the determination shows that the received packet is an ACK packet for the transmitted SYN packet, the CPU 101 proceeds to step S907.

In step S907, the CPU 101 determines whether a value of the entry counter 215 of the internal memory socket search table 201 is equal to a maximum number (threshold value) permitted to be stored in the internal memory socket search table 201. If a result of the determination shows that the value of the entry counter 215 is not equal to the maximum number permitted to be stored in the internal memory socket search table 201, the internal memory socket search table 201 has a free space for storing socket information of the newly established connection. Thus, the CPU 101 proceeds to step S908, and adds the socket information of the newly established connection to the internal memory socket search table 201. An addition procedure of socket information to the internal memory socket search table 201 is similar to that in the active open state, and thus detailed description thereof will be omitted. The amount of socket information stored in the internal memory socket search table 201 has increased, hence the CPU 101 adds "1" to the value of the entry counter 215. After addition of the socket information of the newly established connection to the internal memory socket search table 201, in step S908, the CPU 101 changes the state to ESTABLISHED.

If it is determined that the received packet is not a SYN packet (NO in step S902), the CPU 101 proceeds to step S913. In step S913, the CPU 101 performs processing corresponding to the received packet. Then, the CPU 101 proceeds to step S901 to wait for reception of a packet. If it is determined that the received packet is not an ACK packet for the transmitted SYN packet (NO in step S906), the CPU 101 proceeds to step S914. In step S914, the CPU 101 performs processing corresponding to the received packet. Then, the CPU 101 proceeds to step 905 to wait for reception of a packet.

If it is determined that the value of the entry counter 215 is equal to the maximum number permitted to be stored in the internal memory socket search table 201 (YES in step S907), the CPU 101 proceeds to step S910. In step S910, the CPU 101 searches for socket information of connection first changed to TIME_WAIT in the internal memory socket search table 201. This searching procedure is similar to that in the active open state, and thus detailed description thereof will be omitted.

In step S911, the CPU 101 copies the "socket information of the connection first changed to the TIME_WAIT state" detected in step S910 to the external memory socket search table 301. This copying procedure is similar to that in the active open state, and thus detailed description thereof will be omitted. The CPU 101 adds "1" to a value of the entry counter 315 of the external memory socket search table 301.

In step S912, the CPU 101 deletes socket information in the internal memory socket search table 201 corresponding to the connection first changed to the TIME_WAIT state. This deletion procedure is similar to that in the active open state, and thus detailed description thereof will be omitted. The CPU 101 subtracts "1" from the value of the entry counter 215 of the internal memory socket search table 201 and the value of the TIME_WAIT entry counter 216. Then, the CPU 101 proceeds to step S908.

Thus, the socket information of the connection set in the TIME_WAIT state is prevented from occupying the internal memory 103, so that quick establishment of new connection can be carried out. Further, the socket information of the connection set in the TIME_WAIT state is not discarded but saved in the external memory rather, so that reliability of communication can be maintained.

Next, referring to FIG. 10, an example of an operation of the network protocol processing apparatus 100 during disconnection will be described. FIG. 10 is a flowchart illustrating the example of the operation of the network protocol processing apparatus 100 during disconnection. Processing of the flowchart of FIG. 10 is executed by the CPU 101.

Steps S1001 to S1005 are similar to steps S601 to S605 of FIG. 6, that is the flowchart during disconnection according to the first exemplary embodiment. Accordingly, detailed description thereof will be omitted. In step S1006, the CPU 101 stores "1" in the TIME_WAIT flag 217 of socket information corresponding to connection changed to a TIME_WAIT state. Socket information in which the TIME_WAIT flat 217 is to be changed can be identified based on an address of socket information matched in TCP socket searching when an ACK packet is received for a FIN packet transmitted during disconnection. After change of a value of the TIME_WAIT flag 217, the CPU 101 adds "1" to the value of the TIME_WAIT entry counter 216.

Next, an example of an operation of the network protocol processing apparatus 100 upon time-out of the 2MSL timer 108 will be described.

After the timeout of the 2MSL timer 108, an interrupt signal is asserted to notify the CPU 101 of a passage of 2MSL time via the interrupt controller 109. The CPU 10 that has received this notification reads a value of the entry counter 315 of the external memory socket search table 301, and deletes head socket information of the two-way list if the value of the entry counter 315 is not "0". If the value of the entry counter 315 is "0", the CPU 101 deletes socket information corresponding to connection first changed to the TIME_WAIT state in the internal memory socket search table 201. A searching procedure and a deletion procedure of the socket information corresponding to the connection first changed to the TIME_WAIT state are similar to those during the connection establishment, and thus detailed description thereof will be omitted. After completion of the procedure, the CPU 101 deletes the socket information of the connection where 2MSL time has passed after the change to TIME_WAIT. This processing eliminates the necessity of searching for socket information to be deleted from the external memory socket search table 301, facilitating socket information management. An operation of the network protocol processing apparatus 100 during the TCP socket searching is similar to that of the first exemplary embodiment, and thus detailed description thereof will be omitted.

In each of the exemplary embodiments, the socket information is added to the tail end of the two-way list in order of change to the TIME_WAIT state. Based on the previous pointer 311, the next pointer 312, the head pointer 313, and the tail pointer 314, order of change of the pieces of socket information in the external memory socket search table 301 to TIME_WAIT is identified. However, this method (information) for identifying the order of change of the pieces of socket information in the external memory socket search table 301 to TIME_WAIT is in no way limitative. For example, information directly describing the order of change to TIME_WAIT may be stored in the external memory 104.

In each of the exemplary embodiments, for example, the internal memory 103 is an example of a first memory, the external memory 104 is an example of a second memory, and the socket information is an example of communication endpoint information.

In the first exemplary embodiment, for example, step S604 of FIG. 6 realizes an example of a determination unit, steps S606 and S607 realize an example of a movement unit, and step S606 realizes a second storage unit. For example, step S705 of FIG. 7 realizes an example of a searching unit.

In the second exemplary embodiment, for example, step S806 of FIG. 8 realizes an example of a determination unit, steps S809 and S810 realize an example of a movement unit, and step S809 realizes a second storage unit. For example, step S907 of FIG. 9 realizes an example of a determination unit, steps S911 and S912 realize an example of a movement unit, and step S911 realizes an example of the second storage unit.

As apparent from the foregoing, communication endpoint information corresponding to connection set in a wait state is moved from the first memory to the second memory, hence new connection of a communication line can be quickly established while maintaining reliability of communication.

Other Embodiments

Aspects of the present invention can also be realized by a computer of a system or apparatus (or devices such as a CPU or MPU) that reads out and executes a program recorded on a memory device to perform the functions of the above-described embodiment (s), and by a method, the steps of which are performed by a computer of a system or apparatus by, for example, reading out and executing a program recorded on a memory device to perform the functions of the above-described embodiment (s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2009-135414 filed Jun. 4, 2009, which is hereby incorporated by reference herein in its entirety.

What is claimed is:

1. A communication apparatus comprising:
   a first memory that stores pieces of communication endpoint information relating to communication endpoints of a connection;
   a second memory that operates slower than the first memory;
   a moving device that moves, from the first memory to the second memory, the communication endpoint information stored in the first memory in a case where the connection corresponding to the communication endpoint information is changed to a disconnection wait state; and
   a search unit configured to, in a case where a second connection is changed to the disconnection wait state after a first connection is changed to the disconnection wait state, search communication endpoint information corresponding to the second connection and stored in the second memory, and subsequently search communication endpoint information corresponding to the first connection and stored in the second memory.

2. The communication apparatus according to claim 1, further comprising a determination device that determines whether the connection has changed to the disconnection wait state,
   wherein the moving device moves all of the communication endpoint information corresponding to the connection from the first memory to the second memory, when the determination device determines that the connection has changed to the disconnection wait state.

3. The communication apparatus according to claim 1, further comprising a determination device that determines whether a number of the pieces of communication endpoint information stored in the first memory is equal to or greater than a threshold value,
   wherein the moving device moves all of the communication endpoint information corresponding to the connection from among the pieces of communication endpoint information stored in the first memory, when the determination device determines that the number of the pieces of communication endpoint information stored in the first memory is equal to or greater than the threshold value, and
   wherein the communication endpoint information stored in the first memory is moved based on an order of changes of the pieces of communication endpoint information to the disconnection wait state.

4. The communication apparatus according to claim 1, wherein the moving device moves, from the first memory to the second memory, all of the communication endpoint information corresponding to the connection set in the disconnection wait state from among the pieces of communication endpoint information stored in the first memory when a new connection is requested.

5. The communication apparatus according to claim 1, further comprising a deletion device that deletes pieces of communication endpoint information stored in the second memory as a function of the order of changes of the pieces of communication endpoint information to the disconnection wait state.

6. The communication apparatus according to claim 1, further comprising:
   a first counter that counts a number of connections stored in the first memory to obtain a first value; and
   a second counter that counts a number of connections stored in the first memory and set to a disconnection wait state to obtain a second value,
   wherein one is subtracted from the first value and the second value when the moving device moves the communication endpoint information of the connection to the second memory.

7. The communication apparatus according to claim 6, further comprising a third counter that counts a number of connections stored in the second memory to obtain a third value,
   wherein a new connection can be made when: (1) the first value reaches a first threshold value and the second value is zero, or (2) the first value reaches the first threshold value, the second value is not equal to zero, and the third value reaches a second threshold value.

8. The communication apparatus according to claim 7, wherein the first threshold value is the maximum number of pieces of communication endpoint information permitted to be stored in the first memory, and
   wherein the second threshold value is the maximum number of pieces of communication endpoint information permitted to be stored in the second memory.

9. The communication apparatus according to claim 2, wherein the moving device moves all of the communication endpoint information corresponding to the connection from the first memory to the second memory when a predetermined time has passed after the connection is changed to the disconnection wait state.

10. A control method for a communication apparatus having a first memory and a second memory, the method comprising:
   storing pieces of communication endpoint information relating to communication endpoints of a connection in the first memory;
   moving, from the first memory to the second memory, the communication endpoint information stored in the first memory in a case where the connection corresponding to the communication endpoint information is changed to a disconnection wait state; and searching, in a case where a second connection is changed to the disconnection wait state after a first connection is changed to the disconnection wait state, communication endpoint information corresponding to the second connection and stored in the second memory, and subsequently searching communication endpoint information corresponding to the first connection and stored in the second memory.

\* \* \* \* \*